United States Patent
Hoffman et al.

(10) Patent No.: US 10,953,923 B2
(45) Date of Patent: Mar. 23, 2021

(54) SAFETY DEVICE FOR A VEHICLE

(71) Applicant: Bayerische Motoren Werke Aktiengesellschaft, Munich (DE)

(72) Inventors: Stefan Hoffman, Munich (DE); Maximilian Maier, Munich (DE); David Kogut, Munich (DE); Dorian Darracq, Munich (DE); Peter Rektorik, Neufahrn (DE); Torsten Kloeser, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 15/981,290

(22) Filed: May 16, 2018

(65) Prior Publication Data

US 2018/0257711 A1     Sep. 13, 2018

Related U.S. Application Data

(63) Continuation of application No. PCT/EP2016/078016, filed on Nov. 17, 2016.

(30) Foreign Application Priority Data

Nov. 17, 2015    (DE) .................... 10 2015 222 664.6

(51) Int. Cl.
    *B62D 21/15*      (2006.01)
    *B60K 5/12*       (2006.01)
    *B62D 21/02*      (2006.01)

(52) U.S. Cl.
    CPC .............. *B62D 21/152* (2013.01); *B60K 5/12* (2013.01); *B62D 21/02* (2013.01)

(58) Field of Classification Search
    CPC ......... B62D 21/152; B62D 21/02; B60K 5/12
    See application file for complete search history.

(56) References Cited

U.S. PATENT DOCUMENTS 8,985,671 B1    3/2015    Lei et al.
9,067,617 B2 *   6/2015    Konchan .................. B62D 9/00
(Continued)

FOREIGN PATENT DOCUMENTS

CN     204236393 U    4/2015
CN     104853977 A    8/2015
(Continued)

OTHER PUBLICATIONS

International Search Report (PCT/ISA/210) issued in PCT Application No. PCT/EP2016/078016 dated Feb. 17, 2017 with English translation (seven pages).
(Continued)

*Primary Examiner* — Faye M Fleming
(74) *Attorney, Agent, or Firm* — Crowell & Moring LLP

(57) ABSTRACT

A safety device for a vehicle, in particular a motor vehicle, includes an axle support, a load path expansion element which is connected to the axle support, and a vehicle component which differs from the load path expansion element and which is connected to the load path expansion element. The load path expansion element has a protruding portion which when used as intended is designed to absorb an impact force resulting from a frontal impact of the vehicle against an obstacle with a lateral overlap between the vehicle and the obstacle within a specified region with respect to a vehicle width. The protruding portion protrudes with respect to the axle support transversely to a vehicle longitudinal direction in the direction of a lateral vehicle outer edge situated in the proximity of the obstacle. The safety device is designed such that a portion of the absorbed impact force is transmitted into the axle support, and another portion of the absorbed impact force is transmitted into the component of the vehicle.

20 Claims, 7 Drawing Sheets

(56) References Cited

U.S. PATENT DOCUMENTS

| | | | |
|---|---|---|---|
| 9,988,089 B2* | 6/2018 | Nakamoto | B60R 19/34 |
| 10,059,288 B2* | 8/2018 | Canobbio | B62D 21/152 |
| 10,173,730 B2* | 1/2019 | Hirota | B62D 25/082 |
| 2013/0257028 A1* | 10/2013 | Kuwabara | B62D 21/155 |
| | | | 280/784 |
| 2014/0216839 A1 | 8/2014 | Brockhoff et al. | |
| 2015/0158441 A1 | 6/2015 | Nusier et al. | |
| 2015/0274210 A1 | 10/2015 | Hoiss | |
| 2016/0107697 A1 | 4/2016 | Kramer et al. | |
| 2018/0257589 A1* | 9/2018 | Kawamura | B60R 19/34 |
| 2018/0339732 A1* | 11/2018 | Takii | B62D 21/02 |

FOREIGN PATENT DOCUMENTS

| | | | | |
|---|---|---|---|---|
| CN | 107351794 A | * | 11/2017 | B60R 19/02 |
| DE | 10 2004 001 747 A1 | | 8/2005 | |
| DE | 10 2012 024 145 A1 | | 6/2014 | |
| DE | 10 2013 101 085 A1 | | 8/2014 | |
| DE | 10 2013 007 981 A1 | | 11/2014 | |
| DE | 10 2013 208 144 A1 | | 11/2014 | |
| DE | 20 2014 104 999 U1 | | 11/2014 | |
| DE | 20 2014 105 881 U1 | | 12/2014 | |
| JP | 7-187003 A | | 7/1995 | |
| JP | 2003-72493 A | | 3/2003 | |

OTHER PUBLICATIONS

German-language Written Opinion (PCT/ISA/237) issued in PCT Application No. PCT/EP2016/078016 dated Feb. 17, 2017 (eight pages).

German-language Search Report issued in counterpart German Application No. 10 2015 222 664.6 dated Jun. 14, 2016 with partial English translation (13 pages).

Chinese Office Action issued in counterpart Chinese Application No. 201680066799.1 dated Nov. 18, 2019 (five(5) pages).

* cited by examiner

SAFETY DEVICE FOR A VEHICLE

CROSS REFERENCE TO RELATED APPLICATIONS

This application is a continuation of PCT International Application No. PCT/EP2016/078016, filed Nov. 17, 2016, which claims priority under 35 U.S.C. § 119 from German Patent Application No. 10 2015 222 664.6, filed Nov. 17, 2015, the entire disclosures of which are herein expressly incorporated by reference.

BACKGROUND AND SUMMARY OF THE INVENTION

The present invention relates to a safety device for a vehicle, especially a motor vehicle, as well as a motor vehicle having the safety device according to the invention.

Motor vehicles usually have impact protection elements which channel an impact force, in the event of a frontal collision in a vehicle front middle region with an obstacle or another vehicle, along a defined load path to high-strength support components, such as an axle support, an engine support, a sill or a center tunnel of the vehicle. This is done in order to transform the impact energy or kinetic energy of the vehicle at least partly into deformation energy.

In the case of a frontal collision or frontal impact of the vehicle against an obstacle, such as a tree, a lamp post, or another vehicle, in which only a very slight lateral overlap exists between a front side of the vehicle and the obstacle, the impact energy at rather high speeds may be channeled for example across a crash box arranged in the wheel well, which is designed to become deformed already at low impact speeds, to a longitudinal support such as a sill of the bodyshell of the vehicle.

However, when a lateral overlap between the vehicle and the obstacle corresponds to around 25% of the width of the vehicle, usually no load paths are provided in the vehicle to channel the impact force to high-strength supporting components, so that for example the front wheels, having hard rims, may penetrate into the foot space of the passenger compartment account of the impact energy partly transmitted to them through the end wall separating the engine compartment and the interior compartment, so that the vehicle passengers may suffer serious injuries in this way.

FIG. 1 shows a schematic view of the bottom of a traditionally designed front carriage in conjunction with an obstacle. As is shown in FIG. 1, for example, an axle support, especially a front axle support 200, of which only a section is represented in FIG. 1 and which is connected in a front carriage 100 of a vehicle by means of fasteners such as screws 400 to a bodyshell and possibly to a support beam 500 of a wheel well of the vehicle or a support beam wheel well 500 of the vehicle, is arranged such that it is provided offset from an obstacle 10 in the vehicle transverse direction Y. Therefore, the front axle support 200 and the center tunnel support not shown in FIG. 1 can absorb little or no impact energy in the event of a frontal impact against the obstacle 10 with a lateral overlap of around 25% between the obstacle 10 and the vehicle in terms of the vehicle width. The bumper, not shown, and the support beam wheel well 500 are usually not designed to absorb an impact energy at high speed to a sufficient degree, so that a front wheel, not represented, may penetrate into a foot space of the vehicle, not represented.

One problem which the invention proposes to solve is to provide a safety device for a vehicle with which vehicle passengers can be better protected against injuries during a frontal impact of a vehicle against an obstacle with a lateral overlap of the vehicle with the obstacle.

This problem is solved by a safety device for a vehicle in accordance with embodiments of the invention.

A safety device for a vehicle, especially a motor vehicle, according to one embodiment comprises an axle support, a load path expansion element which is connected to the axle support, and a vehicle component which differs from the load path expansion element and which is connected to the load path expansion element, wherein the load path expansion element has a protruding portion which, when used as intended, is designed in the event of a frontal impact to absorb an impact force resulting from the frontal impact of the vehicle against an obstacle with a lateral overlap between the vehicle and the obstacle within a specified region with respect to a vehicle width, and which protrudes with respect to the axle support transversely to a vehicle longitudinal direction in the direction of a lateral vehicle outer edge situated in the proximity of the obstacle. The safety device is designed such that a part of the absorbed impact force is transmitted into the axle support and another part of the absorbed impact force is transmitted into the component of the vehicle.

The specified region of lateral overlap may span a range between a first value, which corresponds to 25% of a width of the vehicle plus 20 mm, measured from a lateral vehicle outer edge situated in proximity to the obstacle, and a second value, which corresponds to 25% of the width of the vehicle minus 20 mm, measured from the lateral vehicle outer edge situated in proximity to the obstacle.

Owing to the transmission of parts of the impact energy absorbed by the protruding section of the load path expansion element to the axle support and the component of the vehicle, which is preferably arranged near the load path expansion element or around it, the axle support and the surrounding component are plastically deformed, so that corresponding parts of the impact energy can be absorbed in them.

Furthermore, owing to the attachment of the load path expansion element to the axle support and the surrounding component, the requirements on the loading capacity of the connection between the load path expansion element and the axle support can be significantly reduced as compared to a case in which the load path expansion element is only attached to the axle support.

In order to make possible the transmission of the absorbed impact force from the load path expansion element to the axle support and to the surrounding component, the load path expansion element is connected firmly, and directly or indirectly, to the axle support and the surrounding component.

The surrounding component may be connected to the load path expansion element by use of screws, form fit, or welding.

Preferably, the surrounding component is designed as a high-strength structural component of the vehicle, such as an engine support, a deformation element, a bumper cross member, a support beam of a wheel well or a support beam wheel well, a structural strut, a barrier post, or a torque strut bearing.

According to one embodiment, the safety device further comprises a bracing element, which is connected to the load path expansion element and to the surrounding component and which is designed to transmit the other part of the absorbed impact force from the load path expansion element to the component of the vehicle.

The bracing element is preferably firmly fastened to the protruding section of the load path expansion element. Owing to this configuration, one may reduce the risk of the load path expansion element buckling sideways, i.e., in the vehicle transverse direction, or upward or downward, i.e., in the vehicle vertical direction, when absorbing the impact energy and thus only transmitting the impact energy to a slight degree to the surrounding component.

The bracing element may be connected to the surrounding component of the vehicle by use of at least one screw. In addition or alternatively, the bracing element may be connected to the surrounding component of the vehicle by form fit.

Preferably, the surrounding component of the vehicle is arranged at a spacing from the load path expansion element in a vehicle vertical direction. In addition or alternatively, the surrounding component of the vehicle may be arranged at a spacing from the load path expansion element in a vehicle transverse direction.

According to one embodiment, the load path expansion element and the bracing element are a single piece, i.e., formed from a single piece.

In order to strengthen the attachment of the bracing element to the load path expansion element, the bracing element may have a connection section extending transversely to the vehicle longitudinal direction, wherein the connection section is joined in a flat manner to the load path expansion element.

A vehicle, especially a motor vehicle, according to one embodiment has one of the safety devices described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
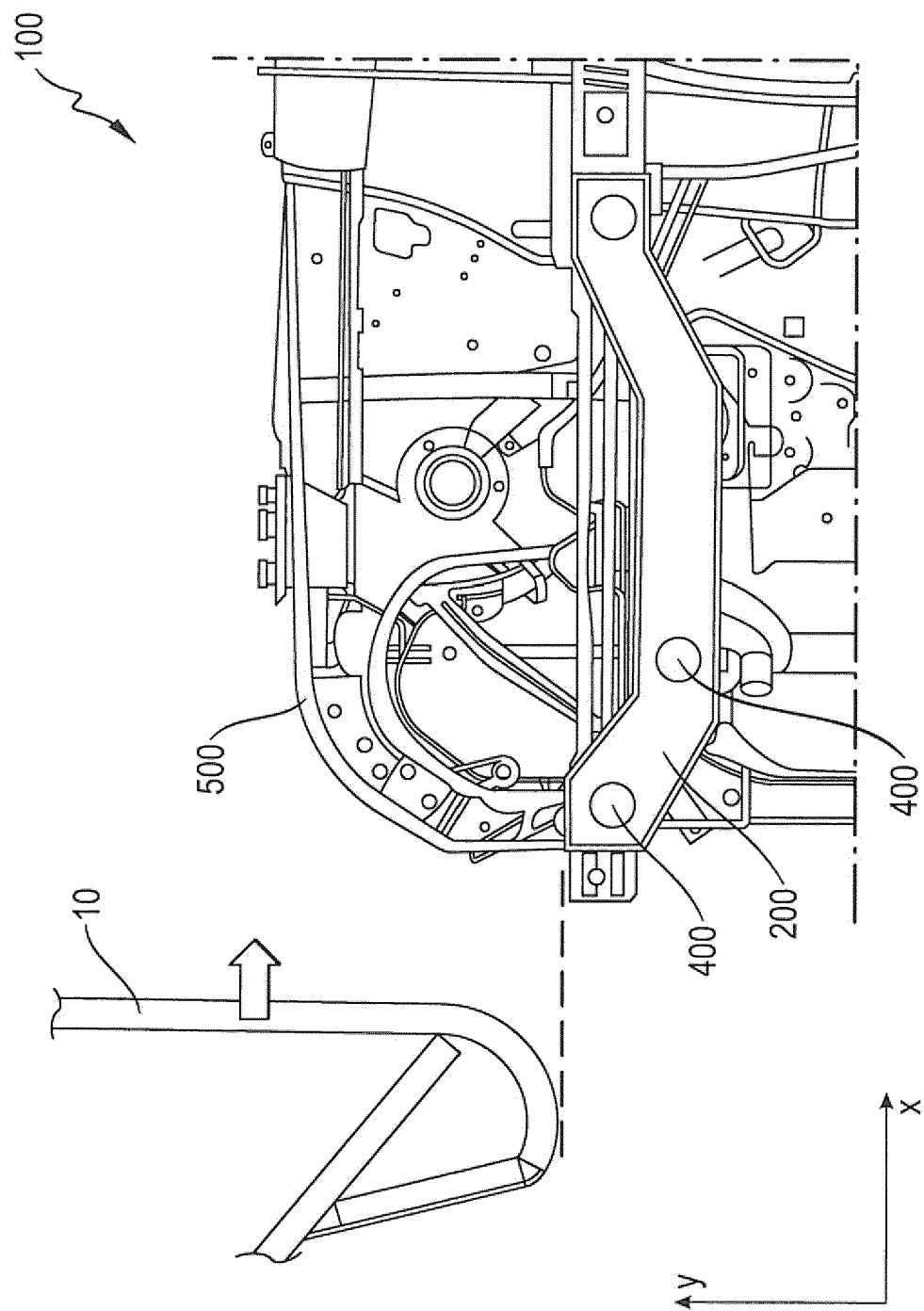
FIG. 1 is a schematic representation to explain the effects of a frontal impact of a traditionally designed front carriage against an obstacle with slight lateral overlap between the front carriage and the obstacle.
Figure 2:
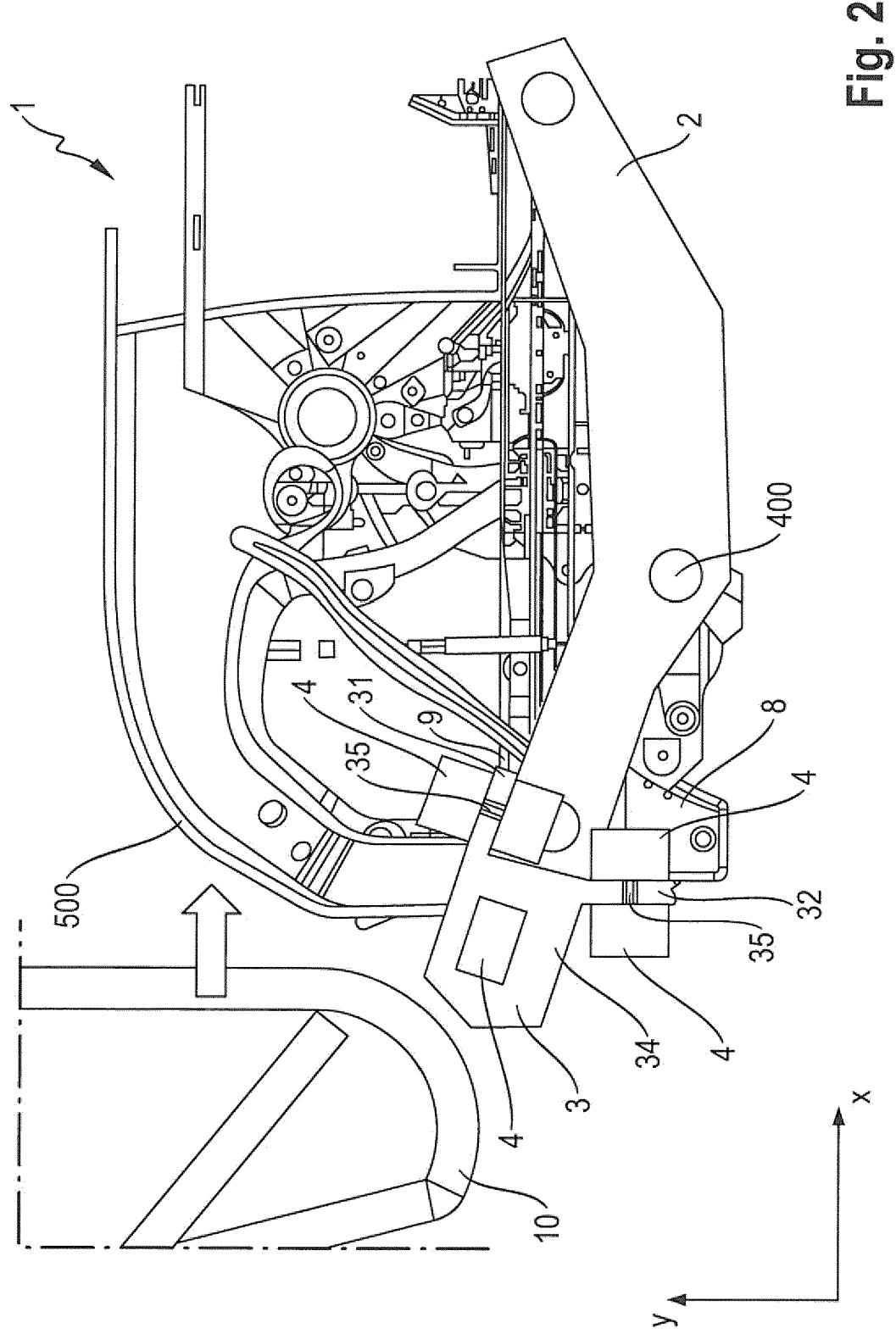
FIG. 2 is a schematic representation to explain the effects of a frontal impact of a front carriage outfitted with a safety device according to one embodiment against an obstacle with slight lateral overlap between the front carriage and the obstacle.

FIG. 2 shows a schematic view of a bottom of a front carriage 1 of a vehicle outfitted with a safety device according to an embodiment of the invention in event of an impact of the vehicle against an obstacle 10 with slight lateral overlap between the front carriage 1 and the obstacle 10. The front carriage 1 has a support beam 500 of a wheel well or a support beam wheel well 500, an axle support 2, of which only a portion is shown in FIG. 2, and which has a cross connection element 8, a bumper, not shown, and other parts, not shown.

The axle support, especially a front axle support or subframe 2, to which parts of the steering of the vehicle, the engine support or the like are fastened, for example, is secured by way of screws 400 directly or indirectly across rubber bearings to the support beam wheel well 500 and a bodyshell of the vehicle.

The obstacle 10 represented in FIGS. 1, 2 and 5 to 7 can be formed as a barrier, for example, which corresponds to that which is used in a test to determine an impact energy absorbing capacity of a vehicle during a frontal impact with slight lateral overlap between the vehicle and the obstacle (Small Overlap Frontal Crash Test), which has been introduced by the Insurance Institute for Highway Safety.

In this test, a vehicle drives at 40 mph against the obstacle 10, and a lateral overlap between the obstacle and the vehicle corresponds to around 25% of the width of the vehicle, measured from an outer edge of the vehicle. A large number of sensors are arranged in the vehicle in order to measure the acceleration forces during the impact. After the impact, furthermore, the deformations of the vehicle are measured, and the safety provided by the vehicle is then classified with the aid of a large number of criteria.

In order to prevent the front wheel or other parts from penetrating through the end wall into the passenger compartment, especially the foot space of the vehicle, a safety device is provided in the front carriage 1. The safety device comprises the axle support 2, a load path expansion element 3, and at least one component 9 different from the axle support 2 and the load path expansion element 3, especially a structural component of the vehicle.

The load path expansion element 3 has a protruding section, which protrudes with respect to or in relation to the axle support 2 transversely to a vehicle longitudinal direction X or along a vehicle transverse direction Y in the direction of the lateral outer edge of the vehicle which is covered by the obstacle 10 or situated near the obstacle 10. The protruding section of the load path expansion element 3 is designed in particular in the event of a frontal impact to absorb an impact force resulting from the frontal impact of the vehicle against an obstacle 10 with a lateral overlap between the vehicle and the obstacle within a specified region with respect to the vehicle width.

In one embodiment, the specified region, for example, may span a range between a first value, which corresponds to 25% of a width of the vehicle plus 20 mm, measured from the vehicle side covered by the obstacle or the lateral outer edge of the vehicle, and a second value, which corresponds to 25% of the width of the vehicle minus 20 mm, measured from the vehicle side or outer edge covered by the obstacle.

The protruding section of the load path expansion element 3 is arranged such that it is located in front of the front wheel and preferably at least partly in front of the support beam wheel well 500, viewed in the vehicle longitudinal direction X. In this way, the load path expansion element 3 can absorb the impact force occurring during the frontal impact with slight lateral overlap before the impact force is transmitted by the obstacle 10 to the support beam wheel well 500 or the front wheel.

The safety device is designed such that a part of the impact force absorbed by the load path expansion element 3 is transmitted into the axle support 2 and another part of the impact force absorbed by the load path expansion element 3 is transmitted into at least one of the components 9 surrounding or situated near the load path expansion element 3.

Owing to the transmission of portions of the impact force onto the axle support 2 and the at least one surrounding component 9, the axle support 2 and the at least one surrounding component 9 are plastically deformed, so that the impact energy is dissipated in these corresponding parts.

In order to enable the transmission of the absorbed impact force from the load path expansion element 3 to the axle support 2 and the component 9 designed as a longitudinal beam of an engine support or an engine longitudinal beam, the load path expansion element 3 is firmly connected directly or indirectly to the axle support 2 and the engine longitudinal beam 9.

Owing to the attachment of the load path expansion element 3 to the axle support 2 and the at least one surrounding component 9, the requirements on the loading capacity of the connection between the load path expansion element 3 and the axle support 2 can be substantially reduced as compared to the case in which the load path expansion element 3 is attached only to the axle support 2.

In the safety device represented in FIG. 2, the axle support 2 and the load path expansion element 3 are designed as separate components which are firmly joined together. The firm connection between the axle support 2 and the load path expansion element 3 can be done, for example, by means of screws, not shown, and/or welding.

Preferably, the load path expansion element 3, designed as a separate component, has greater strength than the axle support 2. The material of which the load path expansion element 3 is made may have a greater strength than the material of which the axle support 2 is made. For example, the load path expansion element 3 may consist of a forged steel, while the axle support 2 may be made from an aluminum casting, for example.

In another embodiment, not shown, the load path expansion element 3 may also be designed integrally or as a single piece with the axle support 2, that is, in this case the load path expansion element 3 is part of the axle support 2.

The load path expansion element 3 comprises a first fastening section 31, which extends from a front end of the axle support 2 (or one situated near a front side of the vehicle) in relation to the direction of travel X and at a slant to the vehicle longitudinal direction X in the direction of a rear end of the vehicle, and in which a through hole 35 is provided. A bracing element 4 is fastened on the first fastening section 31 of the load path expansion element 3 for example by means of a screw, not represented, which passes through the through hole 35. The bracing element 4 is firmly connected to the engine longitudinal beam 9 for example by welding or by means of screws, not shown.

The load path expansion element 3 furthermore comprises a second fastening section 32, which extends from front end of the axle support 2 along the vehicle transverse direction Y in the direction of a lateral vehicle outer edge situated at a distance from the obstacle 10, and in which a through hole 35 is provided. A bracing element 4 is fastened on the second fastening section 32 of the load path expansion element 3 for example by means of a screw, not shown, which passes through the through hole 35. The bracing element 4 is firmly connected to the cross connection element 8 of the axle support 2 for example by welding or by means of screws, not shown.

Furthermore, as is illustrated schematically in FIG. 2, a bracing element 4 is fastened to a main section 34 of the load path expansion element 3 extending in a plane spanned by the vehicle longitudinal direction X and the vehicle transverse direction Y, especially to the protruding section of the load path expansion element 3, being connected to a surrounding component of the vehicle, not shown, which is provided in a vehicle vertical direction at a spacing from the load path expansion element 3. Due to this type of attachment, one may reduce the risk of the load path expansion element 3 buckling sideways, i.e., in the vehicle transverse direction Y, or upward or downward, i.e., in the vehicle vertical direction, when absorbing the impact energy and thus only transmitting the impact force to a slight degree to the surrounding components 2, 9.

As a result of the dissipation of kinetic energy by the deformation of the axle support 2 and the engine longitudinal beam 9, the impact speed of the obstacle 10 against the end wall of the vehicle is reduced. In addition, the obstacle 10 is braced by the load path expansion element 3, the axle support 2 and the engine longitudinal beam 9 and thus the vehicle is shifted relative to the obstacle 10 in the vehicle transverse direction Y. In this way, the vehicle can slide along the obstacle 10, so that the impact force acting on the vehicle is further reduced.

Consequently, owing to the provision of the safety device comprising the load path expansion element 3, the axle support 2 and the engine longitudinal beam 9, the danger of a penetration of vehicle parts, such as the front wheels, through the end wall into the passenger compartment is reduced, so that the stresses on the passengers can be reduced.

Figure 3:
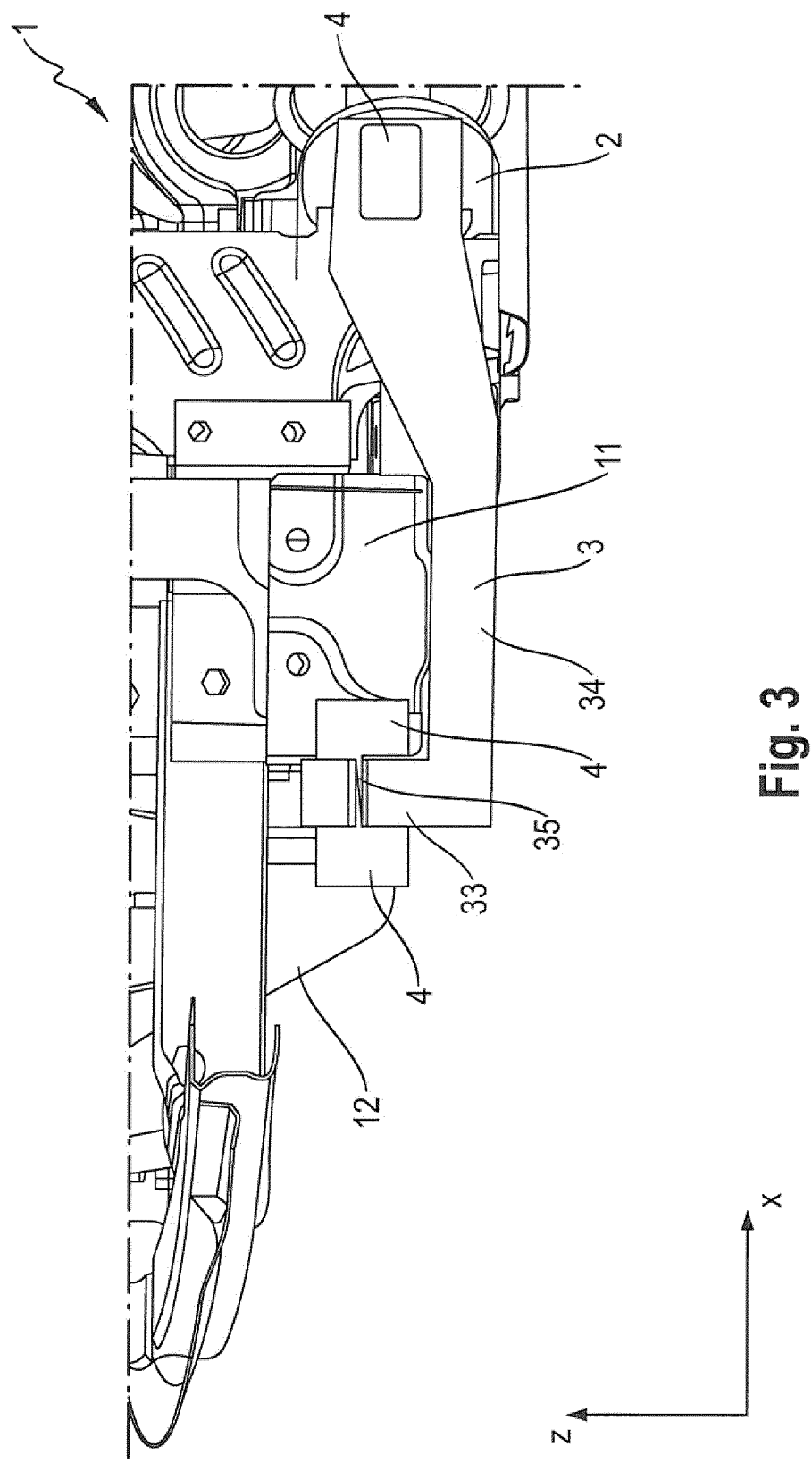
FIG. 3 is a schematic representation to explain a safety device according to one embodiment.

With regard to FIG. 3, according to one embodiment of a safety device the load path expansion element 3 comprises at its front end a fastening section 33, which extends starting from a main section 34 extending in a plane spanned by the vehicle longitudinal direction X and the vehicle transverse direction Y along a vehicle vertical direction Z, and in which a through hole 35 is provided, extending in the vehicle longitudinal direction X. A bracing element 4 is fastened on the fastening section 33 of the load path expansion element for example by means of a screw, not shown, which passes through the through hole 35, which bracing element is firmly connected for example by welding or by means of screws, not shown, to a surrounding component 11 of the vehicle, which is designed as a barrier post, for example, and a surrounding component 12 of the vehicle, which is designed for example as a structural strut or a wedge strut.

Thus, in this embodiment, a portion of the impact force absorbed by the load path expansion element 3 is transmitted into the axle support 2, and another portion of the impact force absorbed by the load path expansion element 3 is transmitted across the fastening section 33 and the bracing element 4 into the surrounding components 11, 12 situated near the load path expansion element 3, which can additionally reduce the danger of buckling of the load path expansion element 3 in the vehicle transverse direction Y or in the vehicle vertical direction Z.

Figure 4:
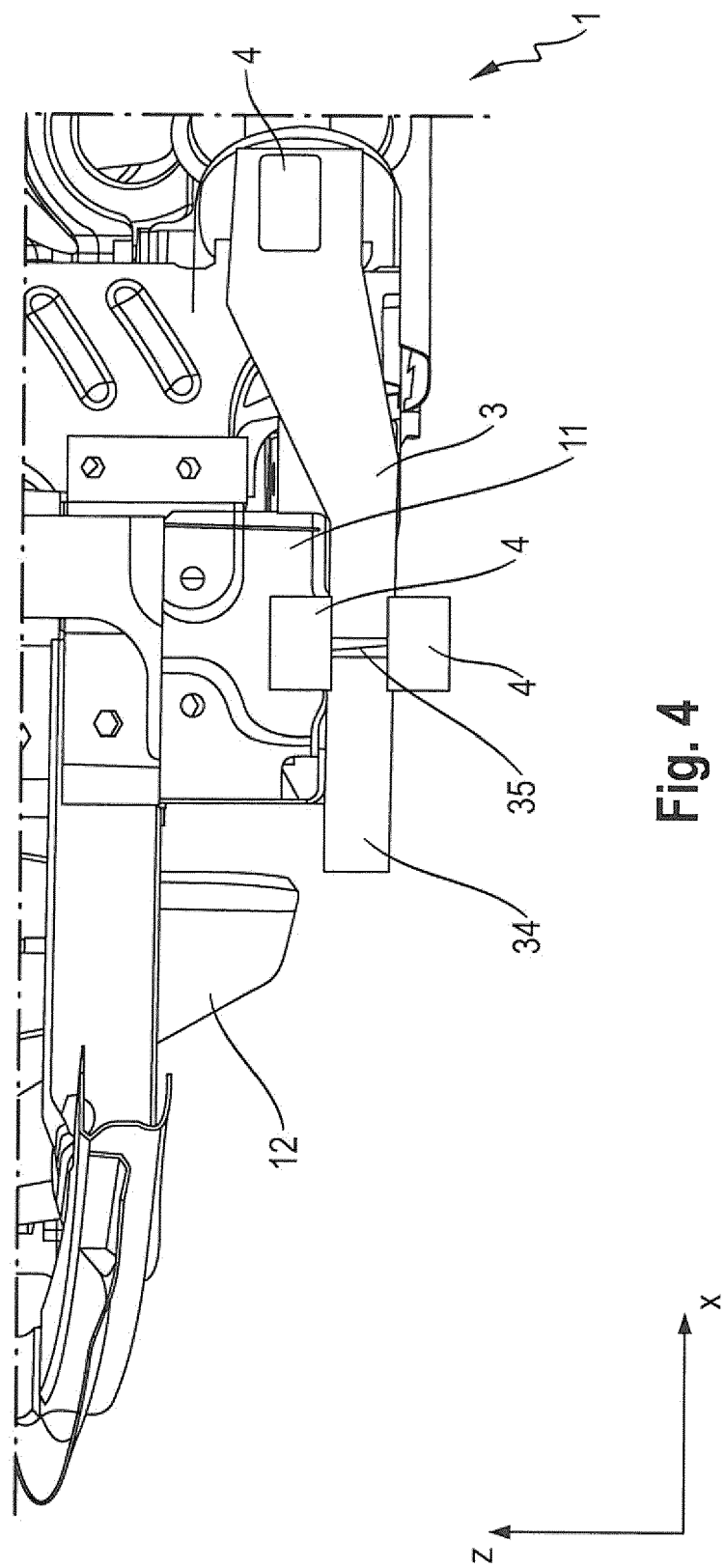
FIG. 4 is a schematic representation to explain a safety device according to one embodiment.

In an embodiment of a safety device represented in FIG. 4, a through hole 35 is provided in a main section 34 of the load path expansion element 3 extending in a plane spanned by the vehicle longitudinal direction X and the vehicle transverse direction Y, with this hole extending along the vehicle vertical direction Z. A bracing element 4 is fastened on the main section 34 of the load path expansion element for example by means of a screw, not shown, which passes through the through hole 35, which bracing element is firmly connected to the component 11 of the vehicle, designed for example as a barrier post, for example, by welding or by means of screws, not shown.

Figure 5:
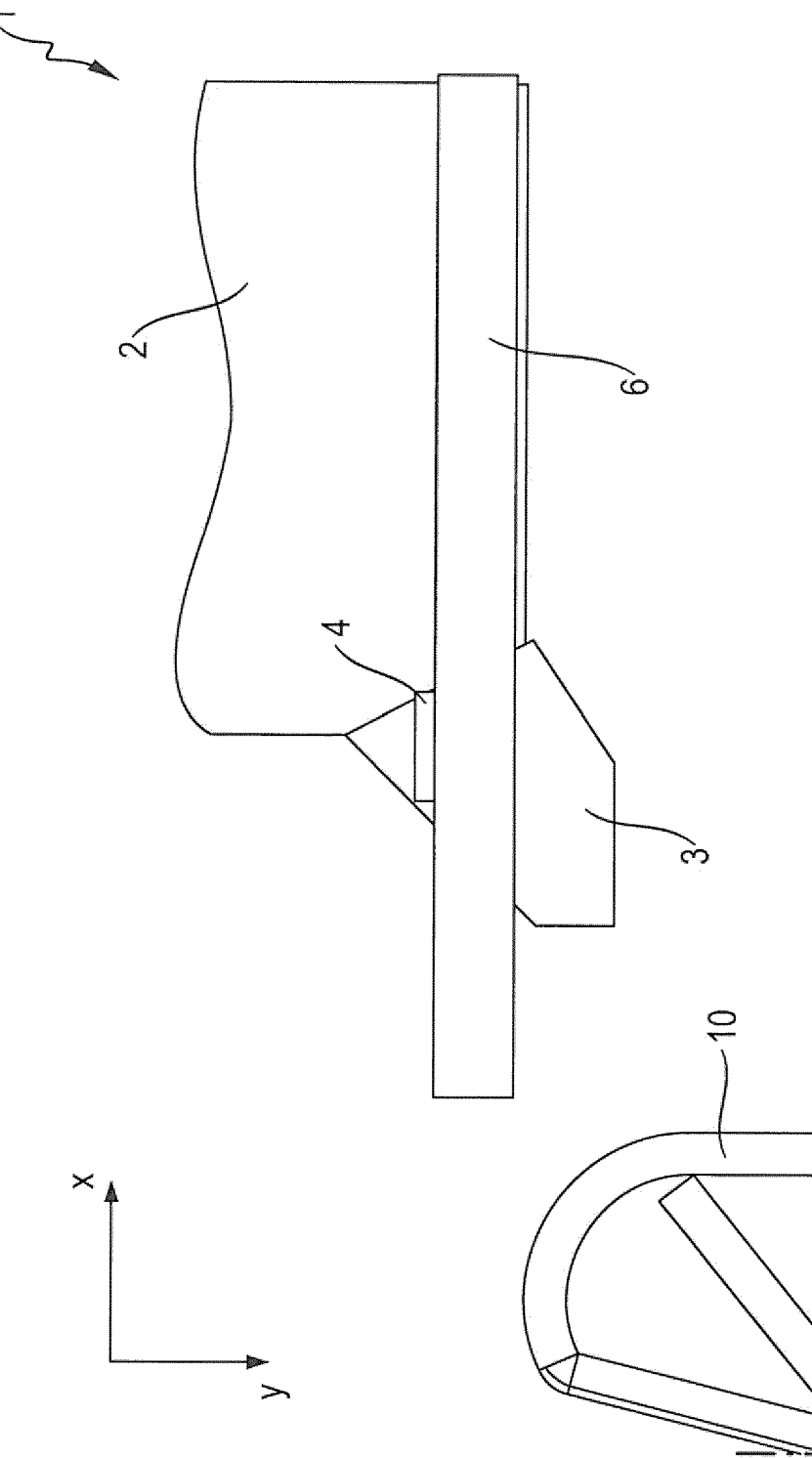
FIG. 5 is a schematic representation to explain a safety device according to one embodiment.

With regard to FIG. 5, which shows a schematic top view of a front carriage 1 of a vehicle outfitted with a safety device according to one embodiment, the load path expansion element 3 can be connected to a first surrounding component, designed as a profile piece 6 of the engine support extending in the vehicle longitudinal direction X, and to a second surrounding component designed as a deformation element (not shown in FIG. 5) by means of a single bracing element 4, as well as the axle support 2. The respective attachments and connections between the load path expansion element 3 and the axle support 2, between the load path expansion element 3 and the bracing element 4, and between the bracing element 4 and the profile piece 6 of the engine support or the deformation element may be designed in accordance with the connections described in regard to FIGS. 2 to 4.

In this embodiment, the load path expansion element 3 is attached across the bracing element 4 to surrounding components arranged at a spacing along the vehicle vertical direction Z, especially to the deformation element and the profile piece 6 of the engine support.

Figure 6:
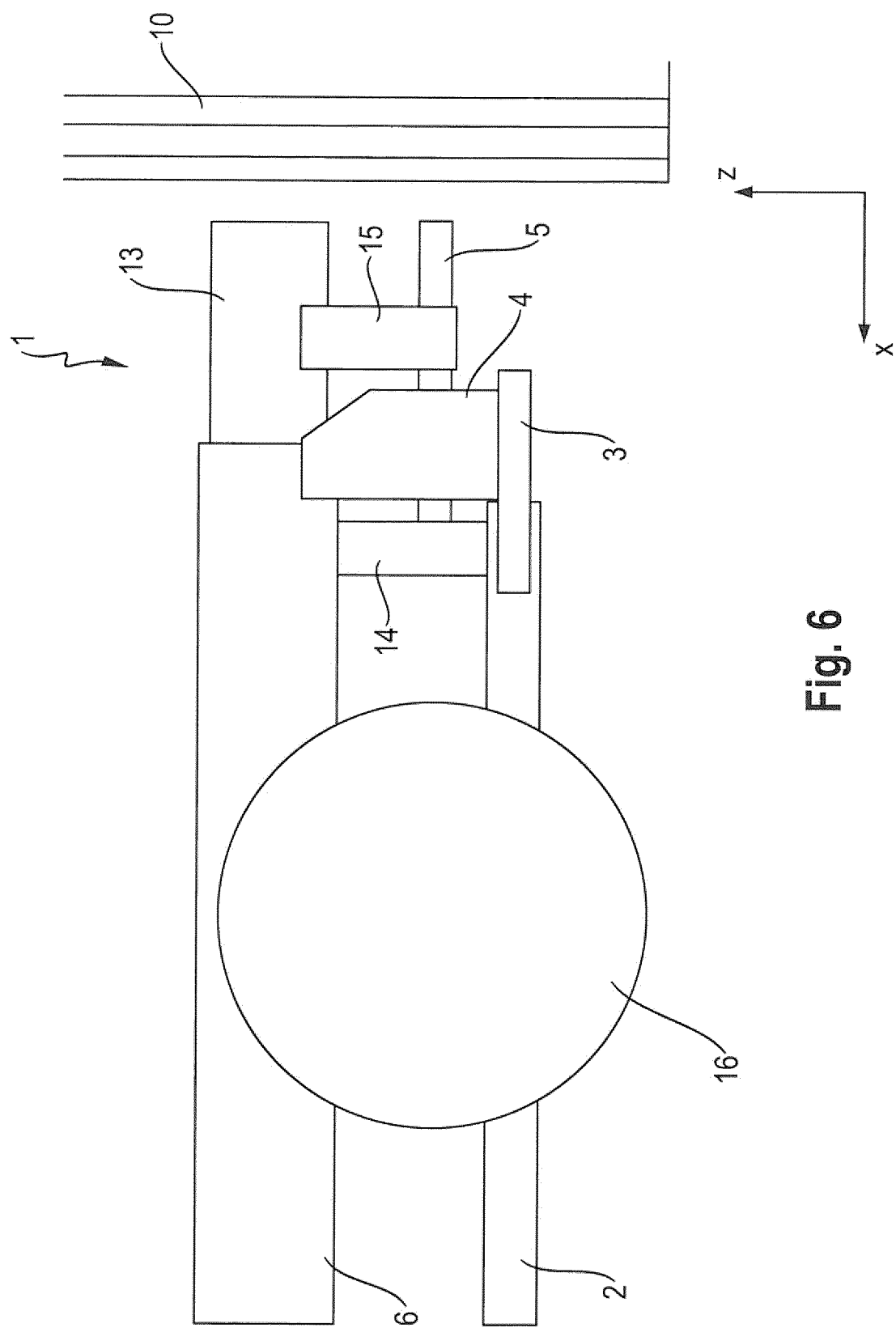
FIG. 6 is a schematic representation to explain a safety device according to one embodiment.
Figure 7:
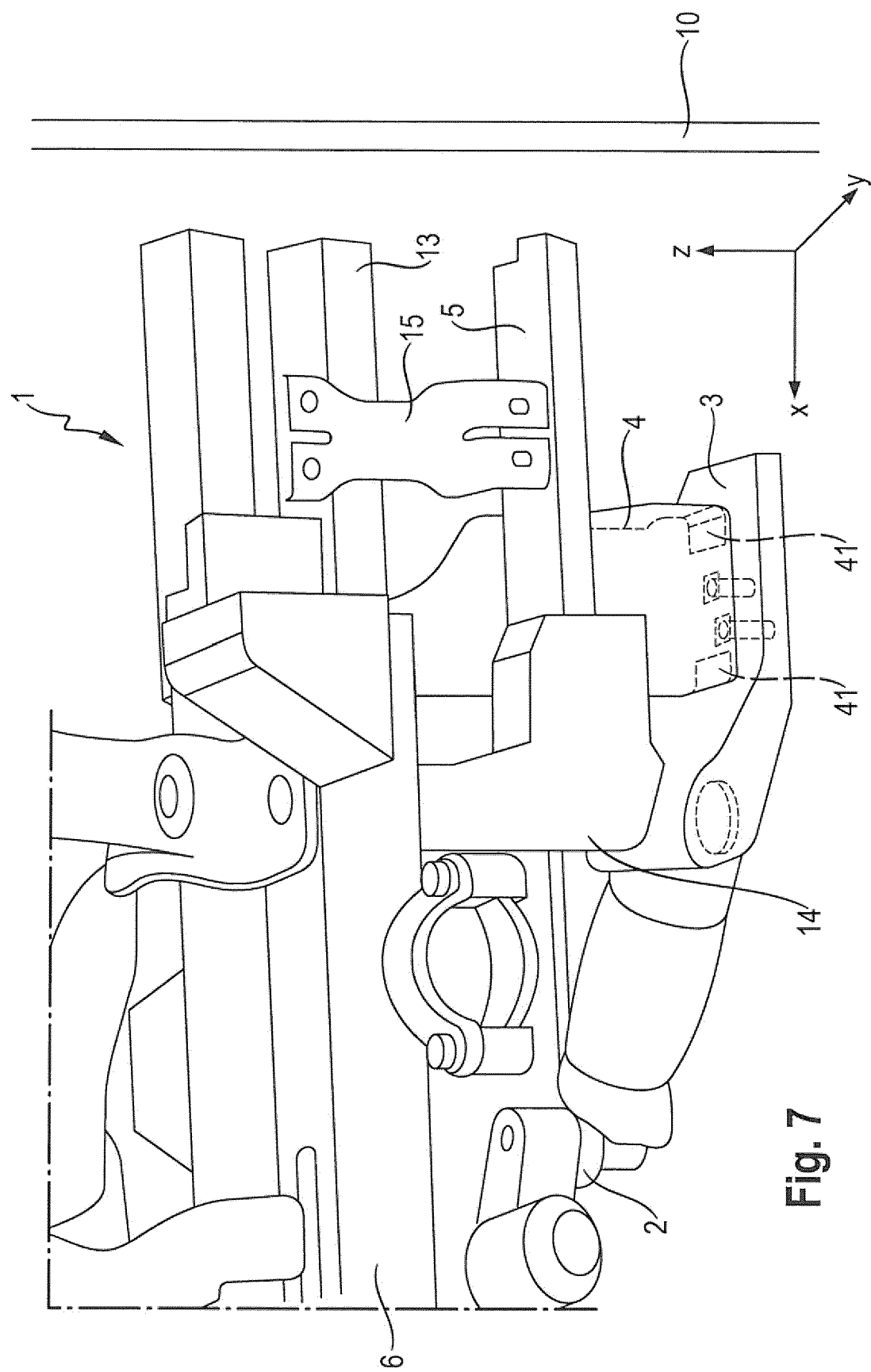
FIG. 7 is a schematic detailed view of the safety device shown in FIG. 6.

FIG. 6 is a schematic side view of a front carriage 1 outfitted with a safety device according to one embodiment, and FIG. 7 is a schematic perspective detailed view of parts of the front carriage 1 shown in FIG. 6.

The front carriage 1 comprises an axle support or a front axle 2, on which a front wheel 16 is suspended, and on which is fastened a load path expansion element 3 similar to that described in regard to FIGS. 2 to 5, as well as a profile piece 6 of the engine support. The profile piece 6 of the engine support is attached by means of a first connection element 14 extending in the vehicle vertical direction Z to the axle support 2. At a front end of the profile piece 6 of the engine support there is arranged a first deformation element 13, which is provided to absorb an impact force in event of a frontal collision in a middle region of the front end of the vehicle with an obstacle or another vehicle and transmit this into the profile piece 6 of the engine support. On the axle support 2 there is fastened a second deformation element 5, for example by means of screws and/or welding, which extends from a front end of the axle support 2 in the direction of a front side of the vehicle and which is provided to absorb an impact force in event of a corresponding frontal collision and transmit this into the axle support 2. The second deformation element 5 is provided between the protruding section of the load path expansion element 3 and the first deformation element 13, especially looking in the vehicle transverse direction Y.

In order to transmit the impact force acting on one of the first and second deformation elements 13, 5 at least partly onto the respective other of the first and second deformation elements 13, 5, the first and second deformation elements 13, 5 are connected by way of a second connection element 15, which is fastened to the first and the second deformation element 13, 5, for example by means of screws and/or welding and/or form fit.

In order to transmit portions of the impact force acting on the protruding section of the load path expansion element 3 onto the surrounding components, especially the profile piece 6 of the engine support and the second deformation element 5, and to reduce the risk of the load path expansion element 3 buckling to the side or upward or downward during the frontal collision with slight lateral overlap, the protruding section of the load path expansion element 3 is connected by way of a bracing element 4 to the profile piece 6 of the engine support and to the second deformation element 5. The bracing element 4 has connection sections 41 extending along the vehicle transverse direction Y, which are connected in a flat manner to the protruding section of the load path expansion element 3. The connection between the connection sections 41 and the protruding portion of the load path expansion element 3 may be produced for example by means of screws and/or as illustrated in FIG. 7 by welding. In one embodiment not shown, the load path expansion element 3 and the bracing element 4 may also be a single piece, that is, made from a single piece. For the connection of the bracing element 4 to the profile piece 6 of the engine support and the second deformation element 5, corresponding screw holes not shown are provided in the bracing element 4, the profile piece 6 of the engine support and the second deformation element 5, through which screws, not shown, are placed and secured for example by means of nuts, not shown.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A safety device for a vehicle, comprising:
   an axle support;
   a load path expansion element connected to the axle support; and
   a vehicle component, which differs from the load path expansion element and is connected to the load path expansion element, wherein
   the load path expansion element has a protruding portion which is designed in an event of a frontal impact to absorb an impact force resulting from the frontal impact of the vehicle against an obstacle with a lateral overlap between the vehicle and the obstacle within a specified region with respect to a vehicle width, and which protrudes with respect to the axle support transversely to a vehicle longitudinal direction in a direction of a lateral vehicle outer edge situated in proximity of the obstacle, and
   a portion of the absorbed impact force is transmitted into the axle support and another portion of the absorbed impact force is transmitted into the vehicle component.

2. The safety device as claimed in claim 1, wherein the vehicle component is connected to the load path expansion element by screws, form fit, or welding.

3. The safety device as claimed in claim 2, wherein the vehicle component is a structural component of the vehicle, configured as one of an engine support, a deformation element, a bumper cross member, a support beam wheel well, a structural strut, a barrier post, or a torque strut bearing.

4. The safety device as claimed in claim 3, further comprising:
   a bracing element, which is connected to the load path expansion element and to the vehicle component and which is configured to transmit the other portion of the absorbed impact force from the load path expansion element to the vehicle component.

5. The safety device as claimed in claim 4, wherein the bracing element is firmly fastened to the protruding section of the load path expansion element.

6. The safety device as claimed in claim 4, wherein the bracing element is connected to the vehicle component by at least one screw.

7. The safety device as claimed in claim 4, wherein the bracing element is connected to the vehicle component by form fit.

8. The safety device as claimed in claim 4, wherein
the vehicle component is arranged at a spacing from the load path expansion element in a vehicle vertical direction.

9. The safety device as claimed in claim 8, wherein
the vehicle component is arranged at a spacing from the load path expansion element in a vehicle transverse direction.

10. The safety device as claimed in claim 4, wherein
the load path expansion element and the bracing element are formed in one piece.

11. The safety device as claimed in claim 4, wherein
the bracing element has a connection section extending transversely to a vehicle longitudinal direction, and the connection section is joined in a flat manner to the load path expansion element.

12. The safety device as claimed in claim 1, wherein
the vehicle component is a structural component of the vehicle, configured as one of an engine support, a deformation element, a bumper cross member, a support beam wheel well, a structural strut, a barrier post, or a torque strut bearing.

13. The safety device as claimed in claim 1, further comprising:
a bracing element, which is connected to the load path expansion element and to the vehicle component and which is configured to transmit the other portion of the absorbed impact force from the load path expansion element to the vehicle component.

14. The safety device as claimed in claim 13, wherein the bracing element is firmly fastened to the protruding section of the load path expansion element.

15. The safety device as claimed in claim 14, wherein
the bracing element is connected to the vehicle component by at least one screw.

16. The safety device as claimed in claim 15, wherein
the bracing element is connected to the vehicle component by form fit.

17. The safety device as claimed in claim 16, wherein
the vehicle component is arranged at a spacing from the load path expansion element in a vehicle vertical direction.

18. The safety device as claimed in claim 17, wherein
the vehicle component is arranged at a spacing from the load path expansion element in a vehicle transverse direction.

19. The safety device as claimed in claim 18, wherein
the load path expansion element and the bracing element are formed in one piece.

20. A vehicle, comprising a safety device as claimed in claim 1.

* * * * *